106-90 AU 113 EX
9/23/80 OR 4,224,076

United States Patent [19]
Moitra et al.

[11] 4,224,076
[45] Sep. 23, 1980

[54] NON-PLASTIC HYDRAULIC CEMENT MIXES AND PROCESS FOR IMPROVING SUCH MIXES

[75] Inventors: Santanu Moitra, Cleveland; Philip A. Rosskopf, South Euclid, both of Ohio

[73] Assignee: Martin Marietta Corporation, Bethesda, Md.

[21] Appl. No.: 968,412

[22] Filed: Dec. 11, 1978

[51] Int. Cl.$^2$ .............................. C04B 7/35
[52] U.S. Cl. ........................ 106/90; 106/97; 106/314
[58] Field of Search ............... 106/90, 97, 314

[56] References Cited
U.S. PATENT DOCUMENTS

| | | | |
|---|---|---|---|
| 3,642,506 | 2/1972 | Johnson | 106/90 |
| 4,019,916 | 4/1977 | Golightly et al. | 106/314 |
| 4,125,410 | 11/1978 | Natsuume | 106/90 |

*Primary Examiner*—James Poer
*Attorney, Agent, or Firm*—Gay Chin; Ronald G. Ort; George W. Moxon, II

[57] ABSTRACT

A method is provided for improving the strength and other properties of non-plastic dry hydraulic cement mixes, such as the dry concrete mixes used for making concrete masonry units. The method comprises incorporating a synergistic combination of two additives into the cement mix. The first additive is a salified methyl or ethyl substituted benzene or naphthalene sulfonate, and is preferably added in an amount of between about 0.01 and 1%, by weight based upon the weight of the cement. The second additive is a tertiary aliphatic amine oxide, and is preferably added in an amount of between 0.001 and 0.1%.

27 Claims, No Drawings

4,224,076

NON-PLASTIC HYDRAULIC CEMENT MIXES AND PROCESS FOR IMPROVING SUCH MIXES

BACKGROUND OF THE INVENTION

This invention relates to the additive compositions, also known as admixtures, for incorporation in hydraulic cement mixes, and more particularly to additive compositions for use in dry mixes, such as those used in making masonry units, pipe and the like.

Non-plastic, dry concrete mixes, in which the amount of mix water is minimized, are used in the manufacture of concrete block, concrete pipe, and other concrete products and structures. Although these dry mixes contain portland cement, aggregate, and water, there is a substantial difference between such concrete mixes and conventional mobile or plastic concrete mixes. The problems involved in the use of non-plastic dry mixes are different from those encountered in the use of conventional concrete mixes, since the dry mixes contain only a minimum of water instead of the larger quantities of water employed in the plastic concrete mixes to give mobility and flowability.

Additives developed for use in plastic concrete mixes are often inapplicable or unsuitable for use in non-plastic dry concrete mixes. For example, there are many well-known additives used as water-reducing and plasticizing agents in plastic concrete mixes. Such additives would not be applicable for these purposes in dry concrete mixes because water reduction and plasticizing are not generally relevant to manufacturing dry mix masonry units.

Another area in which the technology of dry mixes differs from that of plastic mixes is in the problem of air entrainment. Additives used as air-entraining or air-detraining agents in plastic mixes may have little or no utility in dry mixes. Conversely, additives which may be suitable for use in dry mixes may be unsuitable for plastic mixes because of adverse effects on air entrainment in such mixes.

Additives which can increase the strength of masonry units produced from a given dry concrete mix, or which allow the reduction in the amount of cement in such mixes to produce a unit of a given strength are highly desirable. Yet the use of additives for the plastic concrete industry as additives for harsh, relatively dry concrete mixes has not been entirely satisfactory for a number of reasons. First, these additives frequently are simply ineffective in substantially improving the strength of the dry concrete products. In addition, such additives often do not improve or have deleterious effects on other factors which are special to dry mix production but inapplicable to plastic concretes.

One such factor which is of importance in masonry unit production which is irrelevant in the plastic concrete art is friction between the dry mix and the molds and forms through which it must be forced during the production process. When the friction is high it takes more time to force the mix into the molds and forms, thus increasing the manufacturing time per unit, known as the "cycle time." Furthermore, increased friction results in increased abrasive wear on the equipment surfaces which are in contact with the dry mix, causing increased equipment costs and production delays. Therefore an additive which can increase the lubricity of the dry mix with relation to the production equipment is highly desirable, and an additive which may increase strength but which may have a deleterious effect on lubricity might not be suitable for use in dry mixes.

Another problem in the masonry unit industry, particularly with block, has been the lack of uniformity of surface texture and color both with respect to the surface of an individual unit as well as the lack of uniformity from one unit to another which becomes apparent when units are placed together in a wall or other structure. Also, in the case of concrete block, the consumer generally prefers block of lighter shades of color and those having a wavy textural effect known in the industry as a "water-webbed effect". Although it is sometimes possible to produce concrete block with a fair degree of uniformity as far as the surface of an individual block is concerned, it has been extremely difficult, if not impossible, to regularly achieve a high degree of uniformity both as to the surface of an individual block and particularly from one block to another over an extended period of commercial operation. Attempts have been made to produce a pleasing surface texture on the block or other molded masonry units by the use of an additional amount of water in the mix. However, this has not proven successful since the additional water may give the surface a smeared appearance and, in addition, may create problems in the molding and processing of the block.

Many of the additives which have been used to increase strength in plastic concretes have been found unsuitable for use as dry mix additives because of deleterious effects on surface characteristics and color. Therefore, to be suitable for dry mix use, an additive should also produce masonry units with a pleasing appearance and light color.

SUMMARY OF THE INVENTION

The present invention provides a new additive composition which, when incorporated in dry concrete mixes, produces mixes which are more dense and cohesive, resulting in the production of concrete having substantially improved early and ultimate strength. In addition, masonry units produced by employing mixes containing the additive composition of the invention have a pleasing appearance because of their high degree of uniformity both of lightness of color and of surface texture. Moveover the employment of the additive of the present invention reduces the friction between the dry mixes and the molds, forms and other production equipment with which such mixes come in contact during masonry unit manufacture.

The additive composition of the present invention comprises a combination of (1) a salified alkyl benzene or naphthalene sulfonate and (2) a tertiary aliphatic amine oxide. The preferable amounts to be used for a specific sulfonate and a specific amine oxide will vary depending on the concentrations and molecular weights of the specific chemicals, but the specific examples provided in the preferred embodiments described hereinbelow will show how such preferable amounts may be ascertained. Good results are obtained using about 0.01 to about 1% of the sulfonate in combination with about 0.001% to about 0.1% of the amine oxide, with all percents being by weight of the cement in the cement mix.

The preferred hydraulic cement for use in the present invention is portland-type cement, and the hydraulic cement mix may include an aggregate, such as sand and crushed stone or gravel, and enough water to effect hydraulic setting of said cement.

It is an object of the present invention to provide non-plastic cement mixes with improved early and ultimate strength.

A further object is to provide such non-plastic mixes which also reduce the friction between the mixes and the molds, forms, and other equipment used to manufacture such mixes into masonry units.

Another object of the present invention is to provide such mixes which produce masonry unit with uniform and suitable surface texture and color.

A further object is to provide a process for producing such improved dry non-plastic concrete mixes.

These and other objects and advantages of the invention will become apparent upon consideration of the description and discussion which follow.

DESCRIPTION OF THE PREFERRED EMBODIMENT

The admixture of the present invention comprises two components which, when used together, are more beneficial to the properties of dry cement mixes than might be expected by examining the effect of each component by itself on such mixes. The first component is a salified alkyl-substituted aryl sulfonic acid, wherein the aryl group is either benzene or naphthalene, and the alkyl substitution is by one or two methyl or ethyl groups. Hereinafter, unless otherwise stated, the term "sulfonate" is intended to mean an alkyl aryl sulfonate as just described. The preferred alkyl aryl sulfonates in accordance with the present invention are mono- or di-methyl naphthalene sulfonates.

The second component of the admixture of the present invention is a tertiary aliphatic amine oxide, hereinafter sometimes simply referred to as "amine oxide" which may be represented by the general formula

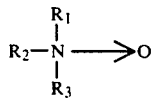

wherein $R_1$ and $R_3$ are selected from the group of relatively short alkyl chains and short alkanol chains containing from about 1 to 3 carbon atoms, and $R_2$ is an aliphatic group containing from about 10 to 18 carbon atoms. Hereinafter, unless otherwise stated, the term "amine oxide" is intended to mean an aliphatic amine oxide as just described. Good results have been obtained with aliphatic amine oxides in which $R_1$ and $R_3$ are both hydroxyethyl groups. A specific preferred aliphatic amine oxide for use in the present invention is a bis(2-hydroxyethyl) cocoamine oxide, which is a commercially available product derived from coconut oil.

The optimum amounts of these two components to add to a particular dry cement mix depends on a number of factors, such as the actual molecular weights and structures of the chemicals used, as well as the particular make-up of the cement mix. The specific amounts stated here and throughout the specification and claims are expressed in percent by weight of the cement in the cement mix. Good results have been obtained using a mixture of from about 0.001 to about 0.1% amine oxide and from about 0.01 to about 1% alkyl aryl sulfonate. Better results are obtained when more than 0.0025% amine oxide is used, as will be shown by higher strengths in the examples below, and even better results when more than 0.005% is used. If less than the above amounts of additives are used, then the desired levels of strengthening will not be achieved. Amounts higher than the above-stated upper limits add unnecessarily to the cost of the mix and either do not add to or may even decrease the strengthening effect of the admixture. The alkyl aryl sulfonate is preferably added in an amount greater than about 0.025%, and more preferably in an amount greater than 0.05%. Also, the amine oxide is preferably limited to no more than about 0.05%, because addition amounts only add marginally to the strength of the mix.

The admixture of the present invention is advantageously incorporated into hydraulic cement mixes by adding it to a portion of the mix water used in preparing the mix. But, depending upon the mix, the additive could be incorporated into the dry cement powder or added in any other convenient manner.

For the purposes of this invention, the term "hydraulic cement" is intended to mean and to include all cementitious compositions capable of being set and hardened by the action of water, such as portland cements, sulfate-resisting cements, blast-furnace cements, pozzolanic cements, and high-alumina cements. The term "cement mix" is intended to include any combination of ingredients with cement, which may be just a simple dry mix of plain cement plus an admixture or a complete concrete mix including cement, aggregate and water. Although the admixture of the present invention is suitable for use with most hydraulic cement mixes, a preferred use is in portland-type cement mixes, which is meant to include portland cements and portland blended cements such as those described in ASTM C 595-74. This includes portland cements blended with fly ash, pozzolana slag, blast-furnace slag or mixtures thereof, and other well-known similar materials. Other cements similar to portland cements, such as alite and belite are also intended to be included as portland-type cements.

The term aggregate is intended to include both fine aggregate, such as sand, and coarse aggregate, such as crushed stone or gravel, as is common in the art. In general, the aggregate may be sand or other fine aggregate or crushed stone or gravel or other coarse aggregate meeting the requirements of ASTM standard C-33. The precise size, purity, quality and quantity, or ranges thereof, of the fine and coarse aggregates will vary depending upon the desired use and properties of the cement mix. The coarse aggregate will usually be of mineral origin, such as gravel or crushed stone or rock, but it may in some cases consist wholly or at least partially of graded metallic material, such as iron chips or slag, light weight aggregate, or other manufactured aggregate.

As a general rule, the strength of the block for any given cement content is higher when the aggregate grading is more coarse. However, sufficient fine material is necessary to produce a workable mix that will give regular and uniform surfaces.

Good results are obtained with a combination of aggregates comprising about 40 to 75% by weight fine aggregate and about 60 to 25% coarse aggregate, depending upon the nature of the aggregate and the desired properties of the mix. An example of a dry concrete mix, such as concrete block, is where the fine (sand) and coarse (gravel) aggregates are within ranges of 55% to 70% by weight of the total aggregate and 45% to 30% by weight of the total aggregate respectively.

The precise amount of cement to be employed depends upon the cement product to be produced, the desired strength of the product, and the costs involved. As an example, for concrete block, a cement to aggregate ratio of 1:10 is commonly employed, although the ratio could range as low as 1:16 or as high as 1:4.

The amount of water employed generally should be enough to effect hydraulic setting of the cement present in the mix and to provide suitable workability. This may broadly range from about 20% to 60% by weight of the cement in the mix for the concretes, which may be more conveniently expressed as a water/cement ratio (W/C), which in this case would be 0.2 to 0.6. The precise amounts of water will depend upon the amounts and characteristics of the actual components of the particular mix, as well as the end use of the cement mix. For concrete block mixes, the water/cement ratio will generally be about 0.5.

Mixes containing the additive composition of the invention may be formed or shaped into products or structure by any of the techniques to which such dry mixes may be adapted. Molded masonry units such as concrete block, concrete pipe, and other molded concrete products may be prepared from mixes containing the additive composition of the invention by employing suitable types of masonry unit molding machines. Concrete blocks are generally molded in machines which employ vibrator or tamping mechanisms to achieve a dense uniform block, while concrete pipe may be formed with such machines, by the use of centrifugal spinning machines, or other densifying mechanical means. After the molding operation, the molded units are usually allowed to preset at room temperature before being cured. The curing operation may be performed in steam chambers in order to produce finished units which possess high strength after only a few hours.

To demonstrate the effectiveness of the use of the combination of alkyl aryl sulfonate and aliphatic amine oxide in accordance with the present invention, sample cement mixes were prepared incorporating these additives and tested for strength and molding time, the results being set out in Table I below. To show the unexpected synergistic effects achieved by combining these additives, comparative tests are also shown in which only one of the two types of additives were used. For comparison, sample mixes with no additives are also included.

Because of variations in the cements and aggregates used, even when the same cement was used on different days, the tests are shown in several groups, each group representing a set of tests that were performed together. A plain sample with no additives is included in each group of tests. For convenience, test samples made with both additives in accordance with the present invention are marked with an asterisk (*).

The water/cement ratio for all of the mixes in Table I was 0.5. It was found that this ratio was too high for some of the mixes containing higher amounts of additives, resulting in the mixes becoming plastic and thus untestable for the present procedures. However, as will be shown in the tests under Table II, the water/cement ratio can easily be adjusted to overcome this problem.

The alkyl aryl sulfonate used in these tests was a commercially available sodium methyl naphthalene sulfonate manufactured by Petrochemicals Company, Inc., and sold under the designation PETRO S. It is a mixture of both mono-and di-methyl naphthalene sulfonates and is commonly used as a wetting agent. The aliphatic amine oxide used in these tests was a commercially available bis (2-hydroxyethyl) cocoamine oxide manufactured by the Armak Chemicals Division of Akzona, Inc., and is sold as a water solution under the designation Aromox C/12-W.

The materials employed in the additive compositions were commercial grades. The aggregate employed was a blend of limestone gravel and quartz sand. The cement employed was a type I portland cement, and the weight ratio of cement to aggregate for all of the mixes was approximately 1:10. The weight ratio of water/cement was approximately 0.5. The fine to coarse aggregate proportion was 67% fine aggregate and 33% coarse.

Where an admixture is used solely in concrete blocks, it would be usual to test the admixture in concrete blocks. By that procedure, a concrete block is molded from each of the mixes to produce 8×8×16-inch (20.32 cm×20.32 cm×40.64 cm) block in accordance with ASTM specification C 90-75. The molded blocks are then cured, such as by steam curing and measurement of compressive strength is determined in accordance with ASTM specification C 140-75 using cement-gypsum capping. But, because of the unavailability and expense of a block molding machine, cylindrical specimens with a diameter of 3 inches (7.62 cm) and a height of 6 inches (15.24 cm) were prepared under conditions simulating the block molding process. As stated above, all comparisons are to plain mixes in which no additives were employed, and it is that comparison which best indicates the advantages of the present invention. Further, instead of steam curing, the cylinders were cured at 73° F. (23° C.) and 100% relative humidity.

The molding times were tested as the samples were being formed. These times are not measured by any official ASTM test procedure but are included merely to show which samples had better molding time. As previously discussed, faster molding times mean faster continuous production and indicate less equipment-damaging friction.

TABLE I

| Mix No. | Dose (percent) | | | Molding Time (seconds) | Compressive Strength p.s.i. (MPa) | |
|---|---|---|---|---|---|---|
| | Naph. Sulf. | Amine Oxide | Total | | 1 Day | 7 Days |
| 1 | — | — | — | 15 | 288 (1.98) | 727 (5.01) |
| *2 | 0.05 | 0.005 | 0.055 | 6 | 482 (3.32) | 1268 (8.74) |
| 3 | — | 0.005 | 0.005 | 10 | 303 (2.09) | 760 (5.24) |
| 4 | 0.05 | — | 0.05 | 8 | 342 (2.36) | 902 (6.22) |
| 5 | — | — | — | 24 | 273 (1.88) | N.T. |
| 6 | 0.25 | — | 0.25 | 12 | 360 (2.48) | N.T. |
| 7 | 0.5 | — | 0.5 | 9 | 362 (2.50) | N.T. |
| 8 | 1.0 | — | 1.0 | 6 | 394 (2.72) | N.T. |
| 9 | 1.5 | — | 1.5 | 5 | 349 (2.41) | N.T. |
| 10 | 2.0 | — | 2.0 | (mix became plastic) | | |
| 11 | — | — | — | 23 | 300 (2.07) | 843 (5.81) |

TABLE I-continued

| Mix No. | Dose (percent) | | | Molding Time (seconds) | Compressive Strength p.s.i. (MPa) | |
|---|---|---|---|---|---|---|
| | Naph. Sulf. | Amine Oxide | Total | | 1 Day | 7 Days |
| 12 | 1.0 | — | 1.0 | 6 | 405 (2.79) | 1044 (7.20) |
| 13 | — | 0.04 | 0.04 | (mix became plastic) | | |
| 14 | — | 0.02 | 0.02 | (mix became plastic) | | |
| 15 | — | 0.015 | 0.015 | (mix became plastic) | | |
| 16 | — | 0.125 | 0.125 | (mix became plastic) | | |
| 17 | — | 0.01 | 0.01 | 10 | 371 (2.56) | 1021 (7.04) |
| *18 | 1.0 | 0.01 | 1.01 | 7 | 404 (2.78) | 1056 (7.28) |
| *19 | 1.0 | 0.05 | 1.05 | 7 | 416 (2.87) | 1078 (7.43) |
| *20 | 1.0 | 0.1 | 1.1 | (mix became plastic) | | |
| 21 | — | — | — | N.T. | 274 (1.89) | N.T. |
| 22 | 0.05 | — | 0.05 | N.T. | 324 (2.23) | N.T. |
| 23 | — | 0.005 | 0.005 | N.T. | 296 (2.04) | N.T. |
| 24 | — | 0.0025 | 0.0025 | N.T. | 279 (1.92) | N.T. |
| 25 | — | 0.00125 | 0.00125 | N.T. | 267 (1.84) | N.T. |
| *26 | 0.05 | 0.005 | 0.055 | N.T. | 421 (2.90) | N.T. |
| *27 | 0.05 | 0.0025 | 0.0525 | N.T. | 361 (2.49) | N.T. |
| *28 | 0.05 | 0.00125 | 0.05125 | N.T. | 306 (2.11) | N.T. |

*In accordance with the present invention.

To further demonstrate the present invention, additional sets of test mixes were prepared using the same materials as in the previous tests. These tests, the results of which are set forth in Table II, consisted of all the possible combinations of additives with dosages of the PETRO S naphthalene sulfonate at 0.01%, 0.1% and 1%, and the dosages of the Aromox C/12-W amine oxide at 0.001%, 0.01%, and 0.1%. Because the previous tests had shown that higher doses of additives may cause a mix to become plastic, the water/cement ratio was reduced in the high amine oxide samples, as indicated in the column headed W/C.

In addition, observations were made of actual concrete blocks formed from mixes made in accordance with the present invention. These blocks had uniform surface texture and color, and the additives generally caused no darkening of the surfaces.

Additional tests were made to determine the applicability of the additives of the present invention for use in plastic cement mixes. It was found that when these additives were added to plastic mixes in amounts similar to those used above, excessive air-entrainment would result, making the plastic cement mixes unsuitable for normal use. Only by reducing the amounts of additives

TABLE II

| Mix No. | Dose (percent) | | | W/C | Molding Time (seconds) | Compressive Strength p.s.i. (MPa) | |
|---|---|---|---|---|---|---|---|
| | Naph. Sulf. | Amine Oxide | Total | | | 1 Day | 7 Days |
| 29 | — | — | — | 0.5 | 24 | 292 (2.01) | 772 (5.32) |
| 30 | .01 | — | .01 | 0.5 | 18 | 267 (1.84) | 820 (5.65) |
| 31 | — | .001 | .001 | 0.5 | 23 | 307 (2.12) | 786 (5.42) |
| 32 | — | .01 | .01 | 0.5 | 13 | 340 (2.34) | 956 (6.59) |
| 33 | — | .1 | .1 | 0.4 | 12 | 449 (3.10) | 891 (6.14) |
| *34 | .01 | .001 | .011 | 0.5 | 18 | 307 (2.12) | 871 (6.01) |
| *35 | .01 | .01 | .02 | 0.5 | 8 | 443 (3.05) | 1198 (8.26) |
| *36 | .01 | .1 | .11 | 0.375 | 16 | 501 (3.45) | 926 (6.38) |
| 37 | — | — | — | 0.5 | 24 | 292 (2.01) | 767 (5.29) |
| 38 | .1 | — | .1 | 0.5 | 10 | 335 (2.31) | 949 (6.54) |
| 39 | — | .001 | .001 | 0.5 | 19 | 291 (2.01) | 764 (5.27) |
| 40 | — | .01 | .01 | 0.5 | 10 | 323 (2.23) | 879 (6.06) |
| 41 | — | .1 | .1 | 0.4 | 15 | 484 (3.34) | 902 (6.22) |
| *42 | .1 | .001 | .101 | 0.5 | 8 | 354 (2.44) | 1050 (7.24) |
| *43 | .1 | .01 | .11 | 0.5 | 7 | 451 (3.11) | 1228 (8.47) |
| *44 | .1 | .1 | .2 | 0.35 | 18 | 554 (3.82) | 1033 (7.12) |
| 45 | — | — | — | 0.5 | 19 | 285 (1.97) | 754 (5.20) |
| 46 | 1.0 | — | 1.0 | 0.5 | 6 | 360 (2.48) | 857 (5.91) |
| 47 | — | .001 | .001 | 0.5 | 19 | 299 (2.06) | 775 (5.34) |
| 48 | — | .01 | .01 | 0.5 | 8 | 332 (2.29) | 918 (6.33) |
| 49 | — | .1 | .1 | 0.4 | 24 | 467 (3.22) | 897 (6.18) |
| *50 | 1.0 | .001 | 1.001 | 0.5 | 6 | 375 (2.59) | 947 (6.53) |
| *51 | 1.0 | .01 | 1.01 | 0.375 | 18 | 512 (3.53) | 1090 (7.52) |
| *52 | 1.0 | .1 | 1.1 | 0.375 | 21 | 546 (3.76) | 1070 (7.38) |

*In accordance with the present invention.

From these test results, it can readily be seen that significant improvements in compressive strength and molding time are achieved by incorporating the combination of additives in non-plastic cement mixes in accordance with the present invention. Furthermore, the data also show that better results are achieved using the combination of the sulfonate and amine oxide than can be achieved using either one alone.

used to very low levels could the air-entrainment problem be avoided. Such low level additions of these additives, however, are not able to produce the desired increase in strength in non-plastic concrete mixes, and therefore would not be in accordance with the present invention.

It was found that for the specific additives used in the above tests, a minimum of about 0.001% Aromox C/12-W and about 0.01% PETRO S were needed to obtain desired improvements in strength and molding time. However, for other additives which might be used in accordance with the present invention, lower levels of addition might still produce comparable results.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

We claim:

1. A method for increasing the strength of non-plastic hydraulic cement mixes comprising incorporating into a hydraulic cement mix an additive comprising
    (a) a salified alkyl-substituted aryl sulfonate, wherein the aryl group is either benzene or naphthalene and the alkyl substitution is by one or two methyl or ethyl groups; and
    (b) a tertiary aliphatic amine oxide in which two of the aliphatic groups are selected from the group consisting of relatively short alkyl and alkanol chains containing 1 to 3 carbon atoms, and the third aliphatic group is a relatively long chain containing 10 to 18 carbon atoms; and
    wherein the amount of said aryl sulfonate incorporated in said cement mix is about 0.01 to about 1%, and the amount of said amine oxide incorporated in said cement mix is about 0.001 to about 0.1%, all percents being by weight of the cement in the cement mix.

2. The method of claim 1 wherein said amount of amine oxide is greater than about 0.0025%.

3. The method of claim 2 wherein said amount of amine oxide is greater than about 0.005%.

4. The method of claim 1, 2 or 3 wherein said amount of amine oxide is less than about 0.05%.

5. The method of claim 1, 2 or 3 wherein said amount of aryl sulfonate is greater than about 0.025%.

6. The method of claim 5 wherein said amount of aryl sulfonate is greater than about 0.05%.

7. The method of claim 4 wherein said amount of aryl sulfonate is greater than about 0.025%.

8. The method of claim 7 wherein said amount of aryl sulfonate is greater than about 0.05%.

9. The method of claim 1, 2 or 3 wherein said amine oxide is a di-hydroxyethyl aliphatic amine oxide.

10. The method of claim 9 wherein said di-hydroxyethyl aliphatic amine oxide is a bis (2-hydroxyethyl) cocoamine oxide.

11. The method of claim 1 wherein said aryl sulfonate is a mono-methyl naphthalene sulfonate, a di-methyl naphthalene sulfonate, or a combination thereof.

12. The method of claim 5 wherein said aryl sulfonate is a mono-methyl naphthalene sulfonate, a di-methyl naphthalene sulfonate, or a combination thereof.

13. The method of claim 1 wherein the hydraulic cement mix comprises water and cement in a ratio of between about 0.2 and about 0.6 by weight.

14. The method of claims 1 or 13 wherein the hydraulic cement mix comprises a portland-type cement.

15. A non-plastic hydraulic cement mix comprising hydraulic cement, aggregate, water and an additive comprising
    (a) a salified alkyl-substituted aryl sulfonate, wherein the aryl group is either benzene or naphthalene and the alkyl substitution is by one or two methyl or ethyl groups; and
    (b) a tertiary aliphatic amine oxide in which two of the aliphatic groups are selected from the group consisting of relatively short alkyl and alkanol chains containing 1 to 3 carbon atoms, and the third aliphatic group is a relatively long chain containing 10 to 18 carbon atoms.

16. The cement mix of claim 15 wherein the amount of said aryl sulfonate present in the mix is about 0.01 to 1%, and the amount of said amine oxide present in the mix is about 0.001 to about 0.1%, all percents being by weight of the cement in the cement mix.

17. The cement mix of claim 16 wherein said amount of amine oxide is greater than about 0.0025%.

18. The cement mix of claim 17 wherein said amount of amine oxide is greater than about 0.005%.

19. The cement mix of claim 16, 17 or 18 wherein said amount of amine oxide is less than about 0.05%.

20. The cement mix of claim 15, 16, 17 or 18 wherein said amount of aryl sulfonate is greater than about 0.025%.

21. The cement mix of claim 20 wherein said amount of aryl sulfonate is greater than about 0.05%.

22. The cement mix of claim 16, 17 or 18 wherein said amine oxide is a di-hydroxyethyl amine oxide.

23. The cement mix of claim 22 wherein said di-hydroxyethyl amine oxide is a bis (2-hydroxyethyl) cocoamine oxide.

24. The cement mix of claim 16 wherein said aryl sulfonate is a mono-methyl naphthalene sulfonate, a di-methyl naphthalene sulfonate, or a combination thereof.

25. The cement mix of claim 20 wherein said aryl sulfonate is a monomethyl naphthalene sulfonate, a di-methyl naphthalene sulfonate, or a combination thereof.

26. The cement mix of claim 15 or 16 wherein the ratio of water to cement present in the mix is between about 0.2 and about 0.6 by weight.

27. The cement mix of claim 15 or 16 wherein the hydraulic cement is a portland-type cement.

* * * * *